(12) United States Patent
Rigotti et al.

(10) Patent No.: US 6,558,086 B1
(45) Date of Patent: May 6, 2003

(54) BROACH FOR USE IN PERFORMING MACHINING OPERATIONS

(75) Inventors: David A. Rigotti, Chesterland, OH (US); Gregory J. Lavoie, Farmington, CT (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/616,522

(22) Filed: Jul. 14, 2000

(51) Int. Cl.[7] .......................... B23P 15/42; B23D 43/04
(52) U.S. Cl. .............................. 407/13; 407/15; 407/19
(58) Field of Search .............................. 407/13, 15, 18, 407/19, 29.12, 29.14, 29.15, 12, 14, 16, 17

(56) References Cited

U.S. PATENT DOCUMENTS

| | | | |
|---|---|---|---|
| 1,364,561 A | * 1/1921 | La Pointe | 407/13 |
| 1,440,933 A | 1/1923 | Perkins et al. | |
| 2,305,713 A | * 12/1942 | Kaplan et al. | 407/19 |
| 2,378,094 A | 6/1945 | Nunes-Vaz | |
| 2,439,822 A | 4/1948 | Phaneuf | |
| 2,585,832 A | * 2/1952 | Phaneuf | 407/17 |
| 2,697,271 A | * 12/1954 | Phaneuf | 407/17 |
| 2,846,756 A | 8/1958 | Novkov | |
| 2,855,656 A | 10/1958 | Poynter | |
| 2,930,111 A | 3/1960 | St. Clair | |
| 3,566,494 A | * 3/1971 | Robinson | 407/18 |
| 3,662,443 A | 5/1972 | Schmidt | 29/95.1 |
| 4,243,347 A | 1/1981 | Clapp et al. | 407/15 |
| 4,740,115 A | * 4/1988 | Hertel et al. | 407/15 |
| 5,037,248 A | * 8/1991 | Heffron | 407/12 |
| 5,176,480 A | * 1/1993 | Kelm | 409/244 |
| 5,242,251 A | * 9/1993 | Armstrong et al. | 407/15 |
| 5,911,548 A | * 6/1999 | Deiss et al. | 409/234 |

OTHER PUBLICATIONS

Affidavit executed by inventor David A. Rigotti on Apr. 23, 2001, and inventor Gregory J. Lavoie on Apr. 27, 2001.

* cited by examiner

Primary Examiner—Henry W. H. Tsai
(74) Attorney, Agent, or Firm—Larry R. Meenan

(57) ABSTRACT

A broach comprises an elongate body having a plurality of longitudinally spaced pockets therein. A threaded hole is provided in each of the pockets. The pockets are adapted to receive cutting inserts. The cutting inserts have a hole that is adapted to align with a hole in the pockets. The aligning holes are adapted to receive insert screws. The insert screws are threadably received in the threaded hole in the pockets. When a cutting insert becomes worn or damaged, it may be removed from its pocket and replaced with another cutting insert. Hence, the broach need not be discarded because of a worn or damaged cutting insert.

19 Claims, 4 Drawing Sheets

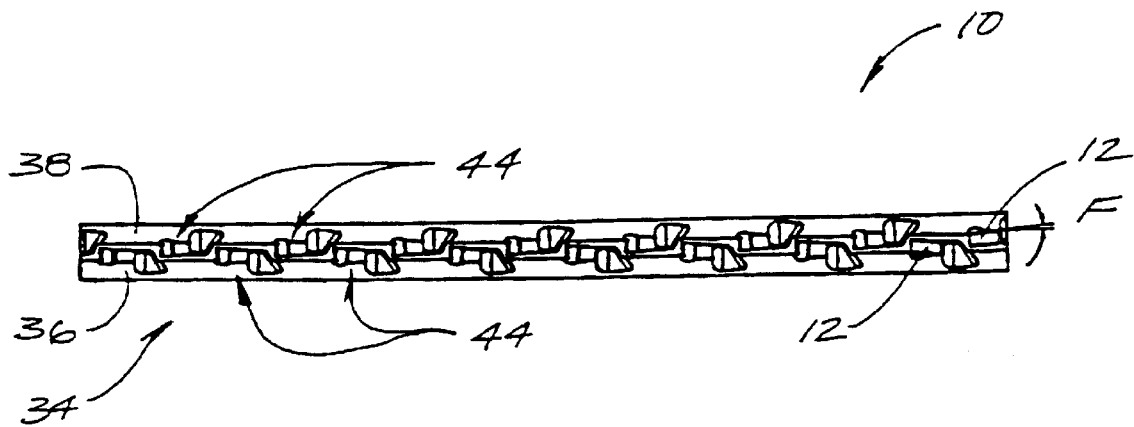
Fig. 3
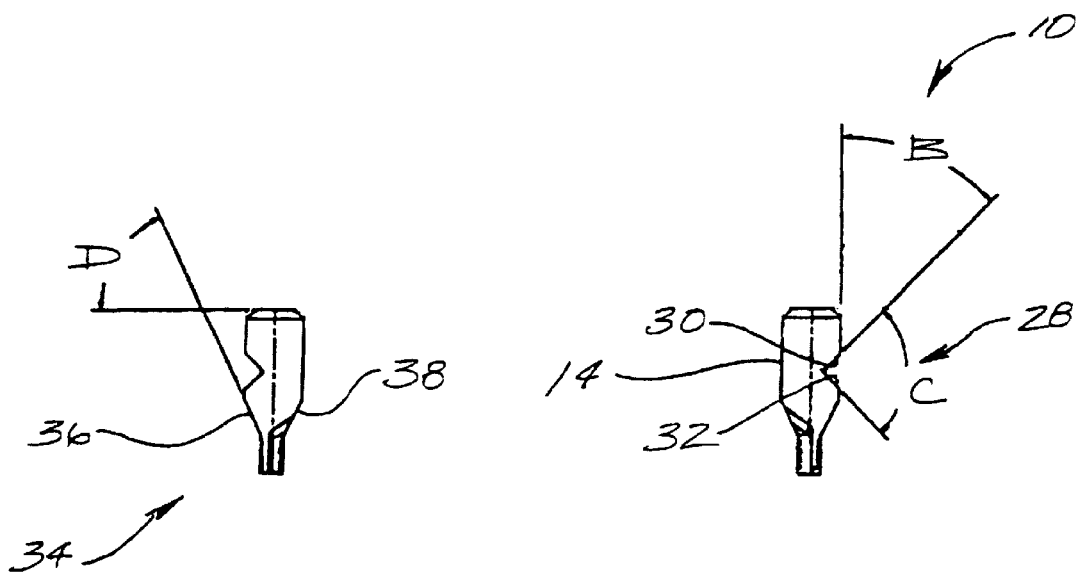
Fig. 4 Fig. 5

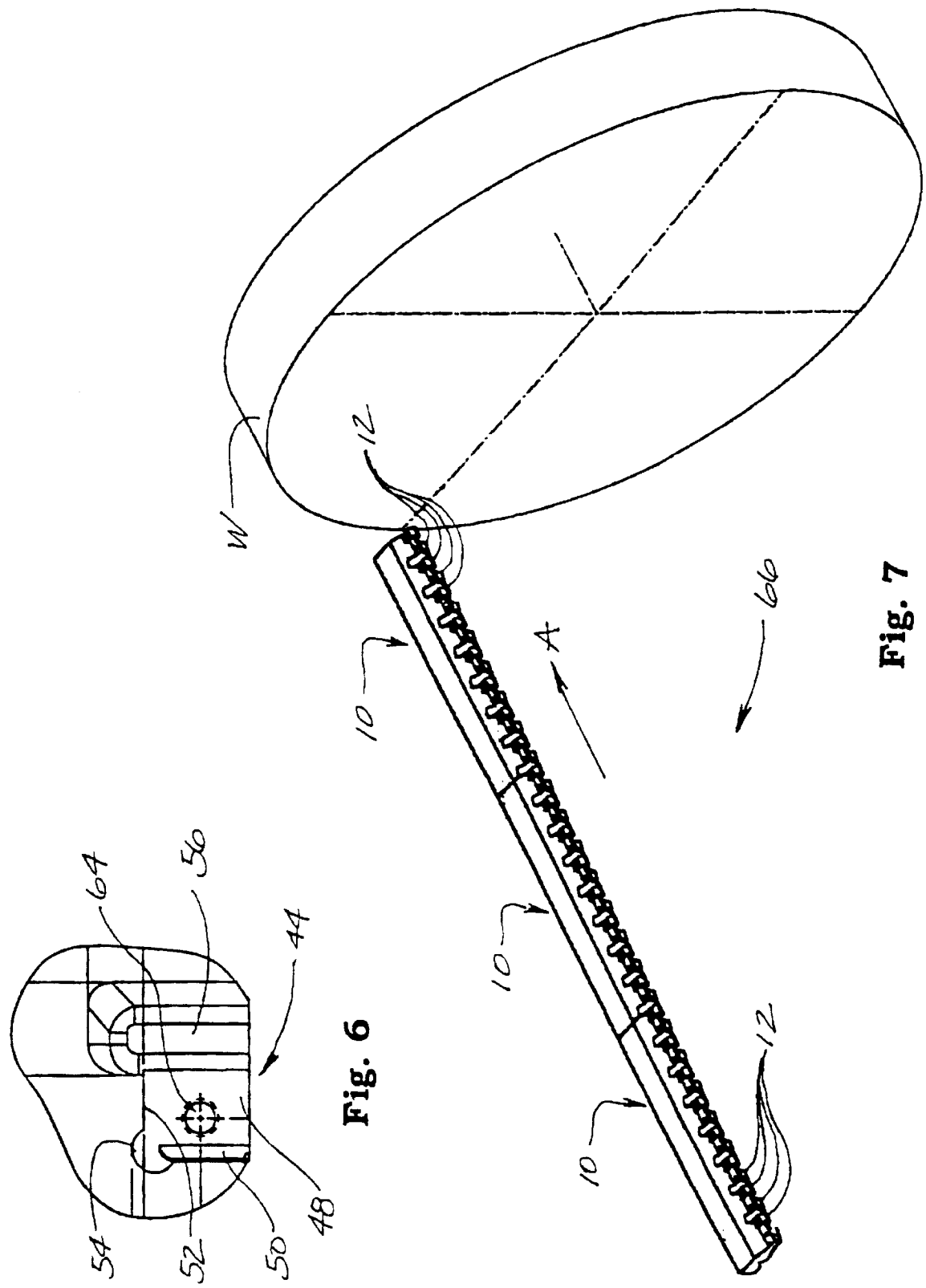

BROACH FOR USE IN PERFORMING MACHINING OPERATIONS

FIELD OF THE INVENTION

This present invention is generally related to cutting tools for use in machining operations, such as milling. In particular, this invention is related to a broach for supporting disposable carbide inserts.

BACKGROUND OF THE INVENTION

Broaches have been commonly used for machining metal, and for specific machine operations, such as cutting slots, openings, and channels of specialized cross-section. Conventional broaches are unitary in construction. Such broaches have a plurality of teeth formed on a single solid stick-like member. The quality of such a broach is only as good as its worst tooth. The existence of a few worn teeth often require that the entire broach be discarded, even though useful life remains in some of its teeth.

Conventional broaches are formed of high-speed steel. Tougher, more expensive materials, such as carbides, cannot be used because of prohibitive costs associated with the tools manufactured of such materials. Moreover, damage to any part of a conventional broach dictates the replacement of the entire tool.

What is needed is a cost-effective broach that does not necessitate disposal when a single portion thereof is worn or damaged.

SUMMARY OF THE INVENTION

The present invention is directed towards a cost-effective broach for supporting cutting inserts. Such a broach does not warrant disposal when a single cutting insert becomes worn or damaged. The broach comprises an elongate body. The body has a plurality of longitudinally spaced pockets therein. A threaded hole is provided in each of the pockets. The pockets are adapted to receive cutting inserts. The cutting inserts have a hole that is adapted to align with a hole in the pockets. The aligning holes are adapted to receive insert screws. The insert screws are threadably received in the threaded hole in the pockets. When a cutting insert becomes worn or damaged, it may be removed from its pocket and replaced with another cutting insert. Hence, the broach need not be discarded because of a worn or damaged cutting insert.

BRIEF DESCRIPTION OF THE DRAWINGS

FIG. 3 is a plan view of the broach shown in FIGS. 1 and 2;

FIG. 4 is an end view of the trailing edge of the broach shown in FIGS. 1–3;

FIG. 5 is an end view of the leading edge of the broach shown in FIGS. 1–3;

FIG. 6 is an enlarged plan view of a pocket for supporting a cutting insert;

FIG. 7 is an enlarged perspective view of the broach interfacing a work piece.

DETAILED DESCRIPTION OF THE INVENTION

Figure 1:
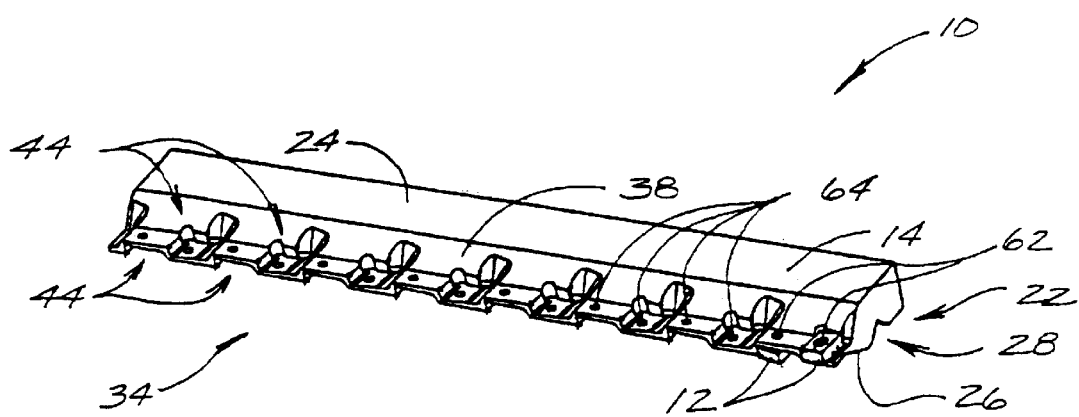
FIG. 1 is a perspective view of an indexable broach according to the invention.

With reference now to FIG. 1, wherein like numerals designate like components throughout all of the several Figures, there is illustrated in FIG. 1 an indexable broach 10. The broach 10 is provided for supporting cutting inserts 12. In particular, the broach 10 is most preferably for supporting indexable disposable carbide inserts. The broach 10 comprises an elongate rail or body 14. The elongate body 14 is preferably formed or constructed from steel.

Figure 2:
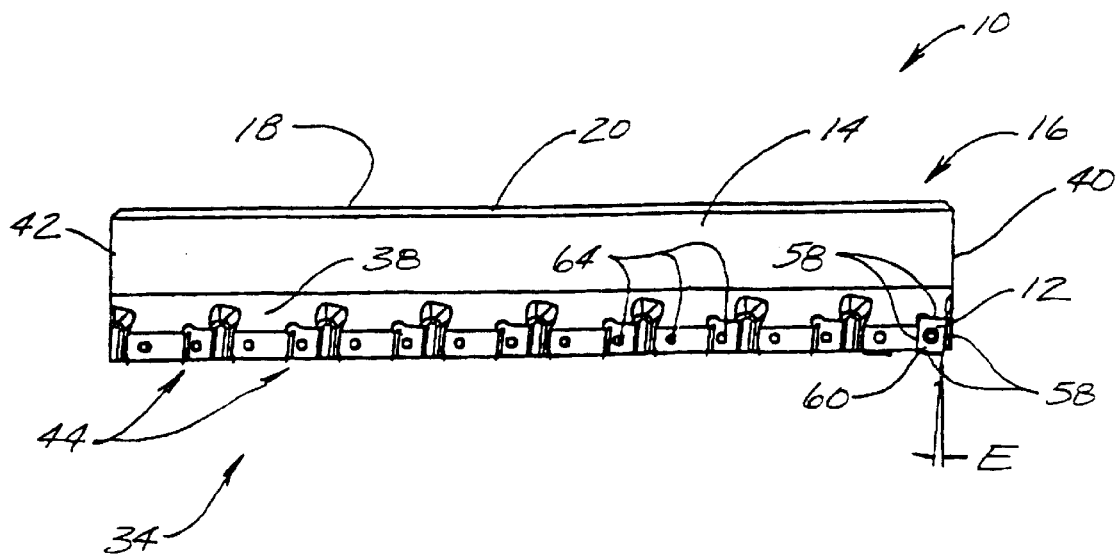
FIG. 2 is an elevational view of the broach shown in FIG. 1.

As shown in FIG. 2, the body 14 includes a top portion, generally indicated at 16. The top portion 16 is adapted to interface with a machine (not shown) to perform machining operations. The top portion 16 is defined in part by a top surface 18. The top surface 18 may be substantially planar. A beveled or chamfered peripheral region 20 may provide a locating surface to interface with the machine.

As shown in FIG. 1, the body 14 further has an intermediate portion, generally indicated at 22.

The intermediate portion 22 has opposing faces 24, 26. A first face 24 is substantially planar and lies in a substantially vertical plane. A second face 26 is generally planar with a V-shaped slot 28 formed therein. The second face 22 likewise lies in a substantially vertical plane. As shown in FIG. 5, the V-shaped slot 28 is defined by two surfaces 30, 32. A first slot surface 30 is preferably disposed at an angle B that is preferably about forty-five degrees to the vertical. A second slot surface 32 is preferably disposed at an angle C that is about ninety degrees relative to the first slot surface 30. The slot surfaces 30, 32 preferably extend longitudinally the entire length of the body 14 to provide a slot 28 that extends the entire length of the body 14.

The slot 28 is provided for receiving a clamp (not shown). The clamp is an integral part of the machine and is adapted to engage the slot 28 in the broach body 14 to hold the broach 10 in a fixed position relative to the machine.

It should be understood that the machine dictates the configuration of the broach body 14. Hence, other configurations may be desirable to interface with other machines.

In addition to the top and intermediate portions 16, 22, the broach body 14 is comprised of a bottom portion, generally indicated at 34. As shown in the drawings, the bottom portion 34 is disposed opposite the top portion 16. The bottom portion 34 preferably has a generally tapered profile defined at least in part by two tapered surfaces 36, 38. Each tapered surface 36, 38 may be disposed at some angle relative to the horizontal. For example, a first one of the tapered surfaces 36 may be disposed at an angle D that is in a range of about sixty-four degrees to about seventy-eight degrees relative to the horizontal, as is shown in FIG. 4. A second tapered surface 38 may be a mirror image of the first tapered surface 36. The tapered bottom portion 34 is provided to insure proper cutting clearance.

As shown in FIG. 2, the broach body 14 further has a leading edge 40, which is oriented to the right of the drawing. A trailing edge 42 is oriented to the left of the drawing. A plurality of longitudinally spaced pockets 44 is provided between the leading and trailing edges 40, 42 of the body 14. In the preferred embodiment of the invention, the pockets 44 are milled in the opposing tapered surfaces 36, 38 of the body 14. For example, as shown in FIG. 3, eight pockets are shown in the first tapered surface 36 while another eight pockets are shown in the second tapered surface 38. As shown in the drawing, the pockets 44 may be staggered so that the pockets in one tapered surface 36 are disposed longitudinally substantially between the pockets in the other tapered surface 38.

The pockets 44 are provided for receiving cutting inserts 12 (only two shown). That is to say, a plurality of cutting inserts 12 may be supported by the broach 10. It is preferable that the cutting inserts 12 be indexable disposable carbide inserts. Each cutting insert 12 is adapted to be received by a corresponding one of the pockets 44.

As shown in FIG. 6, each pocket 44 is defined by three surfaces 48, 50, 52. These surfaces 48, 50, 52 include a bottom surface 48, a back wall 50, and a side wall 52. An end mill or pocket relief 54 is shown at the intersection of the back and side walls 50, 52. The pocket relief 54 is formed by milling the pocket walls 50, 52. A chip gash 56 is provided in the broach body 14 in front of each pocket 44. The chip gash 56 facilitates in the collection and disposal of chips produced from cutting a work piece.

As shown in FIGS. 2 and 3, the pockets 44 may be milled to support their corresponding cutting inserts 12 at a desired angle. For example, the back wall 50 and the bottom surface 48 of each pocket 44 may be disposed at an angle to support a corresponding cutting insert 12 at a desired angle. In a preferred embodiment of the invention, the back wall 50 of each pocket 44 is disposed at a negative angle relative to the vertical. The bottom surface 48 of each pocket 44 is disposed at a negative angle relative to the horizontal. The angles shown in the drawings are about five degrees.

The cutting inserts 12 are preferably indexable. That is to say, each cutting insert 12 preferably includes a plurality of cutting sides, commonly referred to as flank surfaces. The cutting inserts 12 shown have four flank surfaces 58 joined at right angles relative to one another. The cutting inserts 12 also include a rake surface 60, which lies in a plan perpendicular to the four flank surfaces 58.

Each cutting insert 12 may be supported in a corresponding pocket 44 so that at least one of its flank surfaces 58 and its rake surface 60 are disposed at angles dictated by the angles of the back wall 50 and bottom surface 48 of the pocket 44. For example, the flank surface 58 may be disposed at a negative angle E of about five degrees relative to the vertical, as shown in FIG. 2. Similarly, the rake surface 60 may be disposed at a negative angle F of about five degrees relative to the horizontal, as shown in FIG. 3. The flank and rake surface angles E, F should be suitable for producing a clean cut in the work piece.

Each cutting insert 12 is supported in a fixed position relative to its corresponding pocket 44 by an insert screw 62 (shown in FIG. 1). The screw 62 is adapted to threadably engage a threaded hole 64 in the pocket 44. As shown in the drawings, each pocket 44 has a threaded hole 64 therein. Each cutting insert 12 has a hole (shown but not referenced) that is adapted to align with a threaded hole 64 in a corresponding one of the pockets 44. A plurality of insert screws 62 is provided. Each insert screw 62 is adapted to pass through a corresponding one of the cutting insert holes and is threadably received by a corresponding one of the pocket holes 64. The screws 62 may be tightened to support the cutting inserts 12 in a fixed position in the pockets 44.

If a flank surface 58 of a cutting insert 12 becomes worn or damaged, the insert screw 62 may be loosened to permit that insert 12 to be rotated to expose and make use of a new flank surface 58. If an entire cutting insert 12 becomes worn or damage, the cutting insert 12 may be removed and replaced with a new cutting insert 12.

In operation, the body 14 of the broach 10 is supported by the machine (not shown). During the machine operation, the broach 10 passes over a work piece in the direction of arrow A, that is, from left to right, as shown in FIG. 7.

In a machining operation, a plurality of broaches 10 may be used. Each broach 10 may represent a segment. A plurality of segments may form a group, generally indicated at 66 in FIG. 7. During a machine operation, the group 66 passes over the work piece W in the direction of arrow A. As the group 66 passes over the work piece W, the cutting inserts 12 interface with the work piece W to cut a slot in the work piece W.

Figure 8:
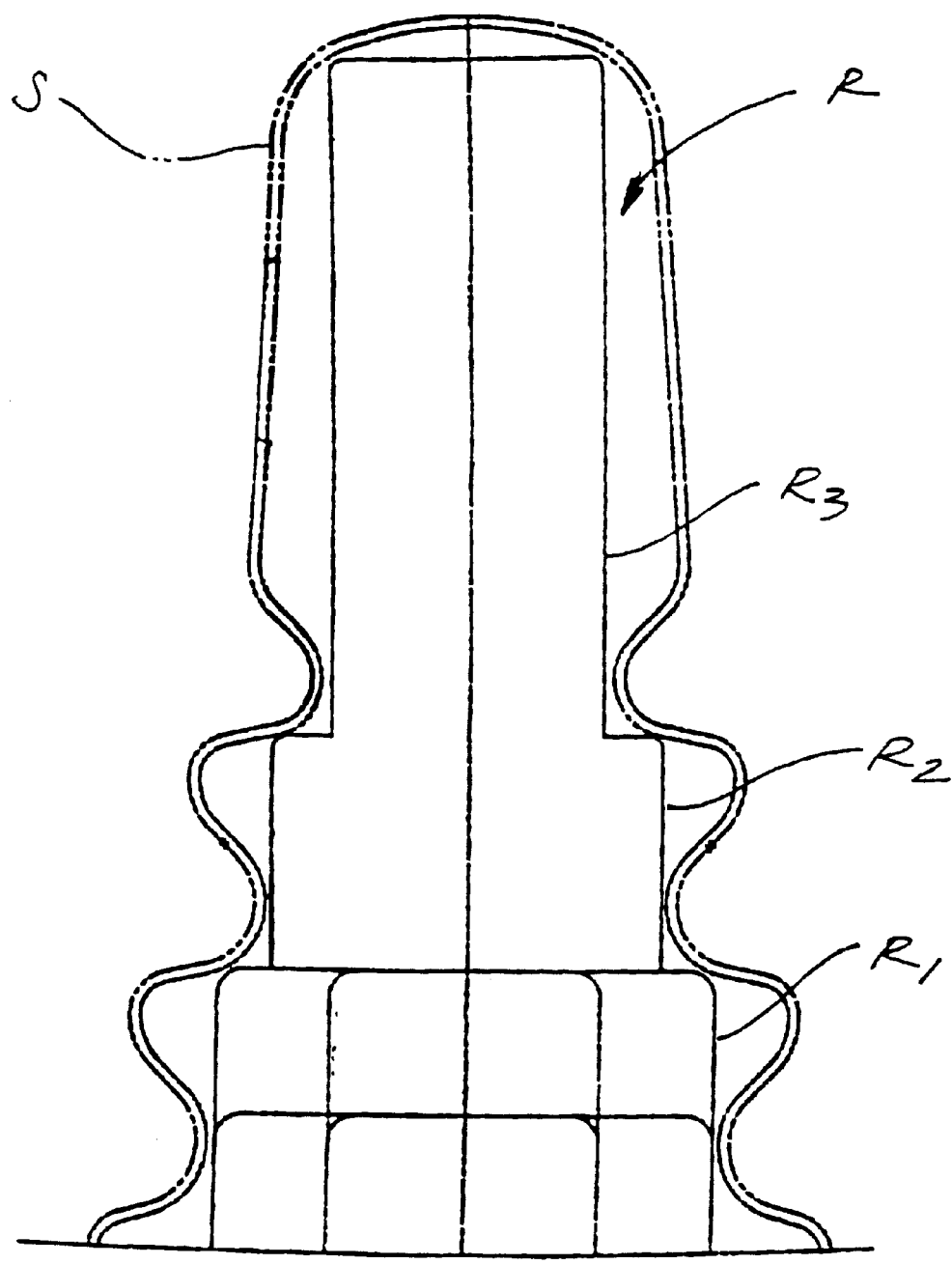
FIG. 8 is an enlarged diagrammatic representation of the profile of a slot cut in a work piece produced by grouped segments formed from a plurality of broaches.

It is often desirable to cut an irregular shaped slot in a work piece. Such a slot S is shown in broken line in FIG. 8. A plurality of groups may be used in a machining operation to make a rough cut R in the work piece. The rough cut R is represented in solid line. Once a rough cut R is made, the formation of the irregular shaped slot S may be completed by a subsequent machining operation.

The rough cut R shown narrows with its depth. Such a cut may be formed with three groups of broach segments. A first group of segments may make a relatively wide cut having a relatively shallow depth. This cut is indicated at $R_1$ in FIG. 8. A second group may make a narrower deeper cut, as indicated at $R_2$. A third group may make the narrowest and deepest cut of all the groups. This cut is indicated at $R_3$.

In the most preferred embodiment, each broach 10 is formed to support cutting inserts 12 that successively cut deeper and deeper and wider and wider. Hence, with each pass of a successive cutting insert 12 over the work piece, a deeper and wider cut is made in the work piece. Thus, each cutting insert 12 has the task of removing a certain amount of material from the work piece.

Successive cuts may be made as desired by forming successive pockets 44 in each broach 10 which deviate with regard to their orientation relative to one another. Moreover, successive cutting inserts 12 may vary in dimension. A resultant broach 10 could produce cuts that vary in dimension.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A broach for cutting inserts, said broach comprising:
an elongate bar having a bottom portion, the bottom portion having a generally tapered profile defined at least in part by two opposing tapered surfaces,
a plurality of longitudinally spaced pockets in the opposing tapered surfaces, the pockets being staggered so that the pockets in one tapered surface are disposed longitudinally substantially between the pockets in the other tapered surface and a threaded hole in each said pocket,
wherein each said pocket being adapted to receive a cutting insert having a hole that is adapted to align with a threaded hole in a corresponding one of said pockets, said aligned holes being adapted to receive an insert screw, said insert screw being threadably engageable with said threaded hole.

2. The broach according to claim 1, wherein said elongate body is formed from steel.

3. The broach according to claim 1, wherein each said pocket is defined by three surfaces including a bottom surface, a back wall, and a side wall.

4. The broach according to claim 3, wherein said back wall and said bottom surface of each said pocket are disposed at an angle to support a corresponding cutting insert at a desired angle.

5. The broach according to claim 1, further including a chip gash provided in the broach body adjacent each said pocket, said chip gash facilitating in the collection and disposal of chips produced from cutting a work piece.

6. The broach according to claim 1, wherein said pockets are formed to support corresponding cutting inserts at an angle.

7. A broach comprising:

an elongate bar having a bottom portion, the bottom portion having a generally tapered profile defined at least in part by two opposing tapered surfaces;

a plurality of longitudinally spaced pockets in the opposing tapered surfaces, the pockets being staggered so that the pockets in one tapered surface are disposed longitudinally substantially between the pockets in the other tapered surface and a threaded hole in each said pocket;

a plurality of cutting inserts, wherein each said cutting insert received by a corresponding one of said pockets, each said cutting insert having a hole that is adapted to align with said hole in a corresponding one of said pockets; and a plurality of insert screws, each said insert screw passing through a corresponding one of said cutting insert holes and threadably received by a corresponding one of said threaded holes.

8. The broach according to claim 7, wherein said elongate body is formed from steel.

9. The broach according to claim 7, wherein each said pocket is defined by three surfaces including a bottom surface, a back wall, and a side wall.

10. The broach according to claim 9, wherein said back wall and said bottom surface of each said pocket are disposed at an angle to support a corresponding cutting insert at a desired angle.

11. The broach according to claim 7, further including a chip gash provided in the broach body adjacent each said pocket, said chip gash facilitating in the collection and disposal of chips produced from cutting a work piece.

12. The broach according to claim 7, wherein said pockets are formed to support corresponding cutting inserts at an angle.

13. The broach according to claim 7, wherein said cutting inserts are indexable.

14. The broach according to claim 7, wherein said cutting inserts are disposable.

15. The broach according to claim 7, wherein each said cutting insert includes a plurality of cutting sides, said cutting inserts being rotatable to use any one of said cutting sides.

16. In combination:

a plurality of broaches each defining a segment, each said broach segment comprising an elongate bar having a bottom portion, the bottom portion having a generally tapered profile defined at least in part by two opposing tapered surfaces;

a plurality of longitudinally spaced pockets in the opposing tapered surfaces, the pockets being staggered so that the pockets in one tapered surface are disposed longitudinally substantially between the pockets in the other tapered surface and a threaded hole in each said pocket, each said pocket being adapted to receive a cutting insert having a hole that is adapted to align with a threaded hole in a corresponding one of said pockets, said aligned holes being adapted to receive an insert screw, said insert screw being threadably engageable with said threaded hole, said segments forming groups comprising:

a first group of segments adapted to make a wide cut in a work piece, said wide cut having a shallow depth;

a second group of segments adapted to make a narrower and deeper cut in the work piece than said first group; and a third group of segments adapted to make a narrower and deeper cut in the work piece than said first and second groups.

17. The broach according to claim 7, wherein each said broach is formed to support said cutting inserts so that each successive one of said cutting inserts cuts deeper and wider.

18. The broach according to claim 7, wherein each said pocket deviates in orientation relative to a successive one of said pockets.

19. The broach according to claim 7, wherein each successive one of said cutting inserts varies in dimension.

\* \* \* \* \*